United States Patent [19]

Hasegawa

[11] Patent Number: 5,546,252
[45] Date of Patent: Aug. 13, 1996

[54] THIN AND SMALL-SIZED FLEXIBLE DISC UNIT

[75] Inventor: Saburo Hasegawa, Hanamaki, Japan

[73] Assignee: Matsushita Electric Industrial Co., Ltd., Osaka, Japan

[21] Appl. No.: 263,685

[22] Filed: Jun. 22, 1994

[30] Foreign Application Priority Data

Jun. 25, 1993 [JP] Japan .................................. 5-154773
Jun. 30, 1993 [JP] Japan .................................. 5-162122

[51] Int. Cl.⁶ .......................... G11B 5/55; G11B 21/08; G11B 5/48; G11B 5/54
[52] U.S. Cl. .......................... 360/106; 360/104; 360/105
[58] Field of Search .................................. 360/106, 109, 360/104, 103, 75, 105

[56] References Cited

U.S. PATENT DOCUMENTS

| | | | |
|---|---|---|---|
| 4,315,698 | 2/1982 | Takahashi | 403/59 |
| 4,723,185 | 9/1984 | Maeda | 360/106 |
| 4,811,143 | 3/1989 | Ohashi et al. | 360/104 |
| 4,901,176 | 2/1990 | Kuzuhara | 360/104 |
| 4,996,619 | 2/1991 | Negishi et al. | 360/106 |
| 5,073,832 | 12/1991 | Ohashi et al. | 360/75 |
| 5,347,414 | 9/1994 | Kano | 360/104 |

FOREIGN PATENT DOCUMENTS

| | | |
|---|---|---|
| 62-88186 | 4/1987 | Japan . |
| 63-25873A | 2/1988 | Japan . |
| 63-98880A | 4/1988 | Japan . |
| 4119570A | 4/1992 | Japan . |

*Primary Examiner*—John H. Wolff
*Assistant Examiner*—Adriana Giordana
*Attorney, Agent, or Firm*—Watson Cole Stevens Davis, P.L.L.C.

[57] ABSTRACT

Within the housing of a flexible disc apparatus, a lead screw is rotatably laid along one side of the housing outside of a disc cartridge accommodation space, the lead screw piercing through bearing holes formed in a guide block from which two carriage arms are extending into the accommodation space, and carrying respectively thereon reading heads for picking up signals from a disc in a flexible disc cartridge loaded in the accommodation space, the distal end of the lower carriage arm is slidably engaged with a guide plate while the guide block and the lead screw are engaged with each other through the intermediary of a lead pin fixed to the guide block; thereby when the lead screw is rotated by a rotary drive mechanism, the guide block and upper and lower carriage arms is pitch-fed, and as a result, the reading heads are fed radially of the disc on the upper and lower surfaces thereof. With this arrangement, it is possible to reduce the longitudinal length of the apparatus in a direction in which the flexible disc cartridge is inserted into the apparatus, and also to reduce the thickness of the apparatus.

12 Claims, 7 Drawing Sheets

THIN AND SMALL-SIZED FLEXIBLE DISC UNIT

BACKGROUND OF THE INVENTION

The present invention relates to a flexible disc apparatus adapted to be used as an external memory device for a computer, and in particular to a small-sized thin flexible disc apparatus.

RELATED ART

A small-sized thin flexible disc apparatus has a width and a height which are slightly larger than those of a disc cartridge to be loaded therein, and has been preferably used as a desk-top type or portable type external memory device. A conventional portable type flexible disc apparatus has a space in which a loaded disc cartridge is stored, and a disc in the disc cartridge is rotated, and a lead screw of a head feed unit for feeding reading heads radially of the flexible disc so as to read signals from the same, which are laid in the longitudinal direction (in a direction in which the flexible disc is inserted inward from a disc insertion slot of the flexible disc apparatus), and accordingly, it has a relatively long length. Further, a carriage carrying the reading heads has to feed a lower head underneath the loaded flexible disc in order to read signals from the lower surface of the flexible disc, and accordingly, a guide shaft for receiving an angular momentum from the carriage caused by the rotation of the lead screw and for guiding the slide feed of the carriage has to be laid below the loaded disc cartridge. Thus, it has been very difficult to reduce the thickness of the flexible disc apparatus.

Japanese Laid-Open Patent No. 4-119570 discloses a flexible disc apparatus in which a lead screw shaft pierces through a carriage and is laid on one side of a disc cartridge loaded in the apparatus. However, in the apparatus a guide shaft also pierces through the carriage below the loaded disc cartridge and accordingly, the reduction of the thickness of the apparatus is difficult. Further, Japanese Laid-Open Patent No. 63-25873 discloses a flexible disc apparatus in which a single motor shaft is formed therein with a guide shaft part and a lead screw part so that the carriage is slidably guided by the guide shaft part and is pitch-fed by the lead screw part. In this apparatus, a piece projected from the carriage slidably engages with a stationary rotation stop so as to receive an angular momentum. However, this document does not positively disclose how the lead screw part specifically engages with the carriage by means of a lead pin although the explanation is made of the engagement of the carriage with the lead screw part by means of the lead pin. Further, this document fails to disclose such an arrangement that reading heads for reading signals from the surfaces of a disc in a loaded disc cartridge are precisely regulated at vertical positions, relative to the surfaces of the disc. Japanese Laid-Open Patent No. 63-98880 discloses a flexible disc apparatus in which a carriage is engaged with a lead screw through the intermediary of a lead pin. However, in this apparatus, a guide shaft slidably pierces through the carriage, and accordingly, the reduction of the thickness of the apparatus is inappropriate. Further, in this apparatus, the lead pin is stably engaged with the lead screw by means of a press spring, and accordingly, noise is likely to occur due to vibration during rotation.

SUMMARY OF THE INVENTION

The present invention is devised in order to eliminate the above-mentioned problems inherent to the prior art flexible disc apparatus.

Thus, an object of the first aspect of the present invention is to provide a flexible disc apparatus having a shortened length and a thine thickness.

Further, another object of the first aspect of the present invention is to provide a flexible disc apparatus which can reduce noise.

Further, an object of the second aspect of the present invention is to provide a flexible disc apparatus in which the working ability of assembly between a carriage and a lead screw by means of a lead pin is enhanced.

An object of the third aspect of the present invention is to provide a flexible disc apparatus in which reading heads for reading signals from the surfaces of a disc in a loaded disc cartridge are precisely regulated at vertical positions relative to the surfaces of the disc.

To the end, according to the first aspect of the present invention, there is provided a flexible disc apparatus comprising a housing having an insertion slot through which a disc cartridge is inserted and an accommodation space wherein the thus inserted disc cartridge is loaded and a disc in the disc cartridge is rotated, the housing having a front side defining therein the insertion slot, a rear side opposing the front side, and left and right sides on opposite sides of the front side; a rotatable lead screw laid along one of the left and right sides; a guide block having bearing holes through which the lead screw pierces; a pair of upper and lower carriage arms extending into the accommodation space from the guide block and adapted to interpose therebetween the loaded disc cartridge; an upper and lower reading heads mounted respectively on the upper and lower carriage arms, for picking up signals from upper and lower surfaces of the disc, respectively; a guide member slidably engaged with a distal end of the lower carriage arm; a lead pin fixed to the guide block and engaged with the lead screw piercing through the bearing holes; and a rotary drive mechanism for rotating the lead screw so as to pitch-feed the guide block through the intermediary of the lead pin, whereby the reading heads are pitch-fed radially of said disc.

With this arrangement in which the lead screw piercing through the bearing holes in the guide block is laid along one of the left and right sides of the housing and is engaged with the lead pin fixed to the guide block, and the distal end of the lower carriage arm extending from the guide block is slidably engaged with the guide member so as to hold the lower carriage arm at a uniform height, the longitudinal length and the thickness of the flexible disc apparatus can be decreased. Further, since the lead pin fixed to the guide block can be engaged with the lead screw piercing through the bearing holes in the guide block with a high degree of accuracy, no moment force occurs, noise can be lowered, and the screw groove on the lead screw can be shallow so that the lead screw can become thinner, thereby it is possible to miniaturize a stepping motor for rotating the lead screw.

According to the second aspect of the present invention, there is provided a flexible disc apparatus comprising a housing having an insertion slot through which a disc cartridge is inserted and an accommodation space wherein the inserted disc cartridge is loaded and a disc in the disc cartridge is rotated, the housing having a front side defining therein the insertion slot, a rear side opposing the front side, and left and right sides on opposite sides of the front side;

a rotatable lead screw laid along one of the left and right sides, outside of the accommodation space; a guide block having bearing holes through which the lead screw pierces; a pair of upper and lower carriage arms extending into the accommodation space from the guide block and adapted to interpose therebetween the loaded disc cartridge; an upper and lower reading heads mounted respectively on the upper and lower carriage arms, for picking up signals from upper and lower surfaces of the disc, respectively; a guide member slidably engaged with a distal end of the lower carriage arm; a lead pin fixed to the guide block and engaged with the lead screw piercing through the bearing holes; and a rotary drive mechanism for rotating the lead screw so as to pitch-feed the guide block through the intermediary of the lead pin, whereby the reading heads are pitch-fed radially of the disc, the guide block is formed therein with a cut-out leaving opposite end parts as rise parts in which the bearing holes are formed, respectively, the cut-out having a bottom surface in which a recess part having an inner peripheral surface is formed, and the lead screw pierces trough the bearing holes formed in the rise parts, and the lead pin has opposite ends which are held in a groove formed in the inner peripheral surface of the recess part and is urged toward the lead screw by a resilient means.

With this arrangement, the lead pin is retracted so as to prevent interference with the lead screw before the lead screw is inserted into the bearing holes, and after the completion of insertion of the lead screw, the lead pin can be pressed toward the lead screw by the resilient means; thereby it possible to facilitate the assembly thereof.

According to the third aspect of the present invention, there is provided a flexible disc apparatus comprising a housing having an insertion slot through which a disc cartridge is inserted and an accommodation space wherein the thus inserted disc cartridge is loaded and a disc in the disc cartridge is rotated, the housing having a front side defining therein the insertion slot, an rear side opposing the front side, and left and right sides on opposite sides of the front side; a rotatable lead screw laid along one of the left and right sides, outside of the accommodation space; a guide block having bearing holes through which the lead screw pierces; a pair of upper and lower carriage arms extending into the accommodation space from the guide block and adapted to interpose therebetween the loaded disc cartridge; a upper and lower reading heads mounted respectively on the upper and lower carriage arms, for picking up signals from upper and lower surfaces of the disc, respectively; a guide member slidably engaged with a distal end of the lower carriage arm; a means for normally pressing the distal end of the lower carriage arm against the guide member; a lead pin fixed to the guide block and engaged with the lead screw piercing through the bearing holes; and a rotary drive mechanism for rotating the lead screw so as to pitch-feed the guide block through the intermediary of the lead pin, whereby the reading heads are pitch-fed radially of said disc.

With this arrangement, the pressing means normally urges the distal end of the lower carriage arm against the guide member, and accordingly, the relative height between the reading heads and the disc in the loaded disc cartridge can be stably maintained.

Further objects, features and advantages of the present invention, will be more clearly understood from the following preferred embodiments of the present invention, which will be detailed hereinbelow with reference to the accompanying drawings in which:

DESCRIPTION OF THE PREFERRED EMBODIMENTS

Figure 1:
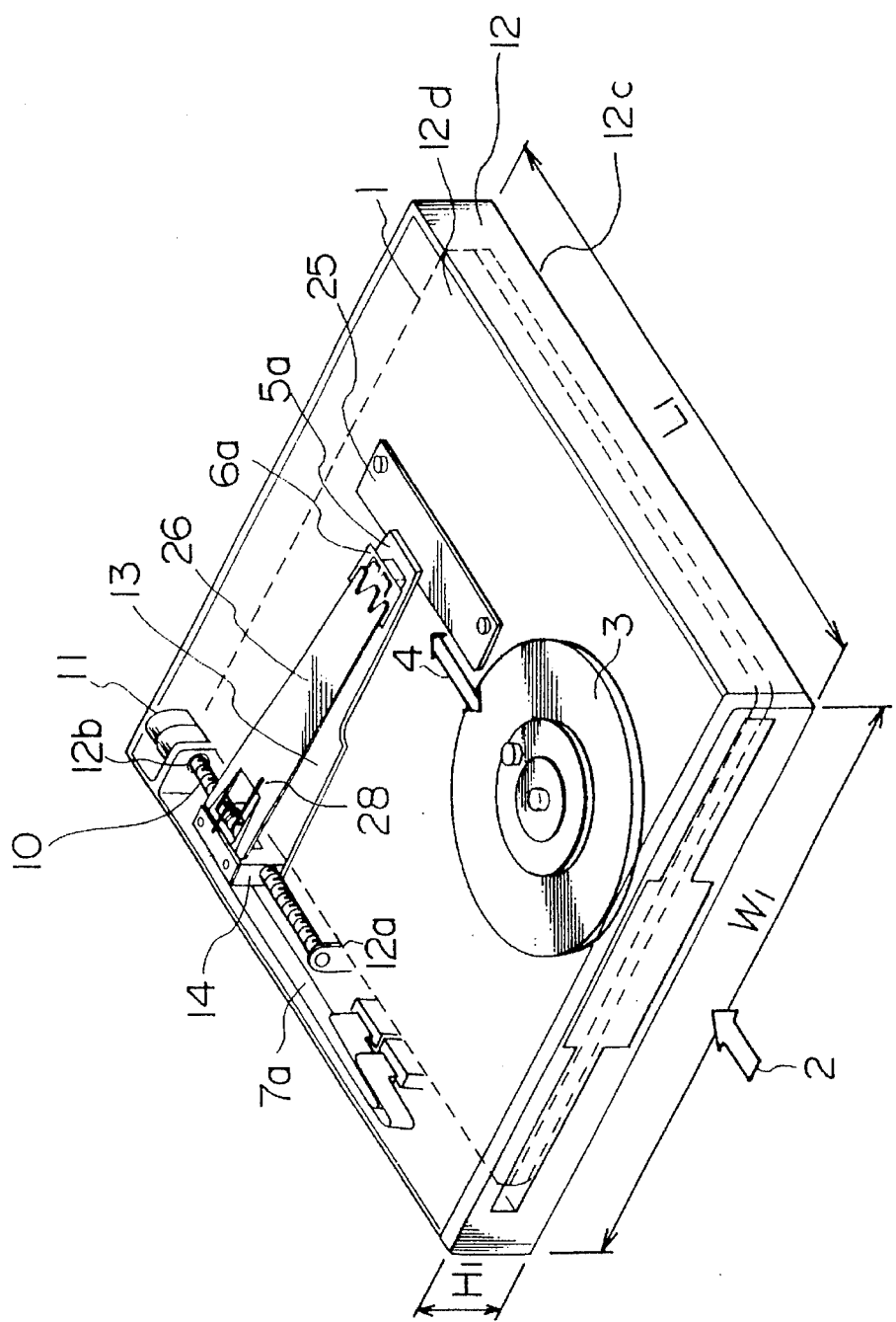
FIG. 1 is a perspective view illustrating a flexible disc apparatus in a first embodiment of the present invention.

Referring to FIG. 1 which is a perspective view that shows a flexible disc apparatus in a first embodiment of the present invention, a flexible disc cartridge 1 is loaded on chassis 12 in a housing 12c within accommodation space 12d defined in housing 12c after it is inserted through an insertion slot, and is engaged with a direct drive motor 3 by means of a center core so as to be rotated.

The apparatus has a width W1, and the flexible disc cartridge is set aside toward the right side of the housing 12c, and a narrow space is defined between the loaded disc cartridge and the left side wall of the housing 12c. A lower carriage arm 13 having a plate-like shape carries at its distal end (at the center of the apparatus) a first magnetic head 5a, and is secured at its proximal end (the left side wall side of the apparatus) to a guide block 14.

A guide plate 25 is secured to the chassis 12, on which the distal end of the lower carriage arm 13 is set so that the height of the lower carriage arm 13 is held.

A lead screw 10 is laid in the narrow space along the left side wall of the housing, and integrally incorporated with a shaft of a stepping motor 11, being inserted into a guide block 14 and rotatably journalled by support lugs 12a, 12b.

An upper carriage arm 26 carries at its distal end a second magnetic head 6a and is attached at its proximal end to the upper surface of the guide block 14 through the intermediary of a rolled plate 27 so as to be openable and closable.

A load spring 28 is supported on a spring retaining part 20 of the guide block 14 (refer to FIG. 2), for pressing the upper carriage arm 26 so that the second magnetic head 6a is urged into a loading condition on the disc.

A head flexible printed circuit 7a is laid along the left side wall of the housing 2c for wiring between coils for the magnetic heads 5a, 6a and an electric circuit. It is noted that the height of the apparatus has a height H1, and a backward length L1 which are slightly larger than those of the flexible disc cartridge.

Next, the guide block 14 will be detailed.

Figure 2:
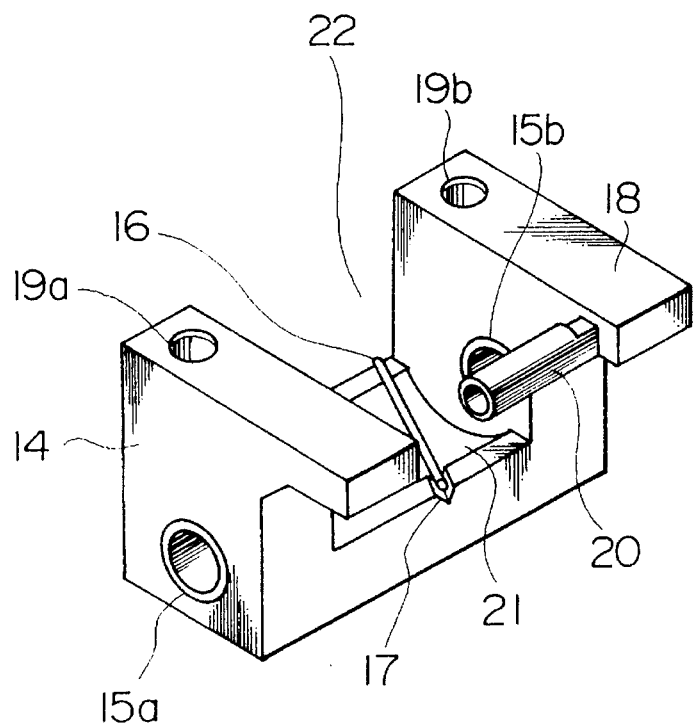
FIG. 2 is a perspective view illustrating a guide block shown in FIG. 1, in detail.

Referring to FIG. 2 which is a perspective view showing the guide block 14 shown in FIG. 1 in detail, the guide block 14 in a substantially rectangular parallelepiped has opposite end protrusions respectively having support surfaces 18 on which the upper carriage arm is supported, and an intermediate cut-out part 22 between the protrusions. A pair of concentric bearing holes 15a, 15b are formed in the opposite end parts of the block near to the bottom surface of the latter. The lead screw 10 is inserted in the bearing holes 15a, 15b. The bottom surface of the cut-out part 22 is relieved so as to form a cylindrical recess part 21 having a diameter slightly larger than the diameter of the lead screw 10 which is therefor led through the recess part 21.

V-like grooves 17 are formed in the bottom surface of the cut-out part 22 on opposite sides of the recess part 21, which receive therein a lead pin 16.

It is noted that the V-grooves may have a rounded shape. Threaded holes 19a, 19b are formed extending toward the bottom of the guide block 14 from the top surface thereof. The spring retaining part 20 has a circular cross-sectional shape and is projected from one of the protrusions having the support surfaces 18.

Next, explanation will be made of the guide block 14 and the lead screw 10.

Figure 3:
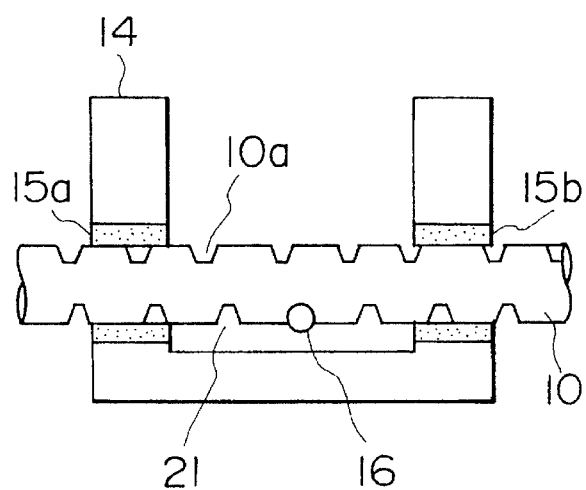
FIG. 3 is a sectional view showing the relationship between the guide block and the lead screw shown in FIG. 1.

In FIG. 3 which is a sectional view illustrating the guide block 14 and the lead screw 10 in an assembly, the engagement between the lead pin 16 and a lead screw groove 10a on the lead screw 10, and the positional relationship between them and the bearing holes 15a, 15b are shown.

Referring to FIG. 3, the bearing holes 15a, 15b are formed concentric with each other in both ends of the bearing block 14, and may be press-fitted therein with sintered oleo-metals. The lead pin 16 fitted at its both ends in the V-like or rounded-shape grooves 17 formed on both sides of the recess part 21 is engaged with the lead screw groove 10a on the lead screw 10.

Figure 4:
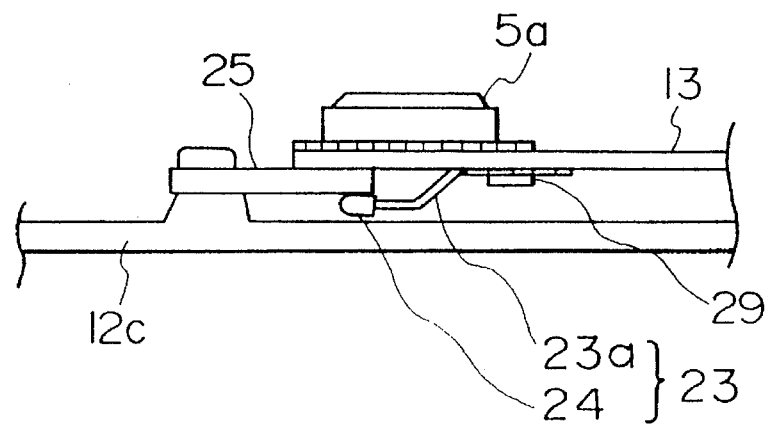
FIG. 4 is a side view showing the relationship between a guide pate and carriage arms shown in FIG. 1.

Next, explanation will be made of the height holding arrangement for the lower carriage arm 13 with reference to FIG. 4. The first magnetic head 5a is held on the distal end part of the lower carriage arm 13 which makes contact with the guide plate 25 fixed to the chassis 12 so that lower carriage arm 13 is held at a fixed height. A resilient arm 23 is fixed to the lower surface of the lower carriage arm 13 by means of a fixing part 29, for holding the guide plate 25 between itself and the distal end part of the lower carriage arm 13 which is therefor made into close contact with the guide plate 25. The arm 23 may consist of a spring member 23a and a load spring 24 made of plastic materials or the like.

Further, the guide plate 25 is coated with a friction reducing material so as to reduce the friction force between itself and the lower carriage arm 13.

Next, explanation will be made of operation of the first embodiment.

Referring to FIG. 1, each time when the stepping motor 11 rotates the lead screw 10 inserted through the bearing holes 15a, 15b in the guide block 14, and engaged with the lead pin 16 through the lead screw groove 10a thereon, the lead pin 16 is fed so as to feed and position the first and second magnetic heads 15a, 15b. Since the lead screw 10 has a length slightly larger than the sum of the diametric recording range of the disc and the length of the guide block 14, the heads can be positioned at any recording track on the disc.

The lead screw 10 is journalled and held by the support lugs 12a, 12b so as to guide the lower carriage arm 13 in its travel direction 4, and to position recording and reproducing gaps on the first and second magnetic heads 5a, 5b along the trackwise direction of the disc, thereby it is possible to hold the interchangeability among discs. Further, the guide plate 25 uniformly holds the height of the lower carriage arm 13, and accordingly, the height of the recording surface of the magnetic head thereon is held, relative to the associated recording surface of the disc, thereby it is possible to carry out recording and reproducing.

The upper carriage arm 26 is supported by the guide block 14, and is adapted to be opened and closed between the center of the apparatus and the upper side wall of the housing 12c in association with a holder (which is not shown) in a loading mechanism (which is also not shown) for the flexible disc cartridge 1. That is, the upper arm 26 allows the second magnetic head 6a to lift off from the disc in order to load and unload the cartridge 1.

Referring to FIG. 3, the clearance between the outer diameter of the led screw 10 and the inner diameter of the bearing holes 15a, 15b is about several microns or several tenth of microns, and further, the depth of engagement between the lead screw groove 10a and the lead pin 16 is less than 1/10 of a value in a range of 0.15 to 0.4 mm. Thus, the lead pin 16 never come off from the lead screw groove 10a.

Referring to FIG. 1, the upper carriage arm 26 is curved so as to apply an appropriate pressure. In this case, the dead weights of the lower carriage arm 13 and the first magnetic head 5a, and impinging force exerted thereupon are also considered. For example, about 10 to 25 gr is applied so that the lower carriage arm 13 is made into close contact with the guide plate 25. Thus, in this embodiment, since the flexible disc cartridge is set aside toward one side wall of the housing 12c so as to obtain a narrow space between the one side wall of the housing 12c and the cartridge, the lead screw is laid in the narrow space and the lower carriage arm can be extended from the one side to the center of the apparatus. Further, the distal end of the lower carriage arm 13 is slidably supported by the guide plate 25 so that the height thereof is uniformly held, and the proximal end thereof is secured to the guide block 14 while the lead screw 10 inserted through the bearing holes 15a, 15b is engaged with the lead pin 16 secured to the guide block 14. Accordingly, the lead screw 10 can be laid along one side of the housing; thereby it is possible to shorten the longitudinal length L1 of the apparatus. Further, the lower carriage arm 13 is supported by the guide plate 25, resulting in a smaller number of components located underneath the loaded flexible disc cartridge, and accordingly, it is possible to reduce the overall height H1 of the apparatus. Further, since the lead screw 10 is inserted through the bearing part 15a, 15b, the engagement between the lead pin 16 and the lead screw groove 10a of the lead screw 10 can be held with a high degree of accuracy so that no torque is induced; thereby it is possible to reduce noise. Further, since the lead pin 16 never come off from the lead screw groove 10a on the lead screw 10, the depth of the lead screw groove 10a is shallow so that the diameter of the lead screw 10 can be decreased; thereby it is possible to miniaturize the stepping motor 11. Moreover, since the cut-out 22 formed therein with the V-grooves 17 is formed in the guide block 14, and since the threaded holes 19a, 19b and the spring retaining part 20 can be integrally formed with the guide block 14, a high degree of accuracy can be ensured.

It is noted that the bearing holes 15a, 15b are fitted therein with sintered oleo-metals, coating is made over the guide plate 25, and the arm 27 is composed with the spring member 27a and the load spring 28. Thus, the friction between the guide block 14 and the lead screw 10 and between the lower carriage arm 13 and the guide plate 25 can be reduced, so that it is possible to ensure a high degree of positioning accuracy, and to miniaturize the stepping motor 11.

As clearly understood from the foregoing description, the flexible disc apparatus according to the present invention in which the lower carriage arm is extended from one side of the apparatus to the center part thereof, and the distal end of the lower carriage is supported by the guide plate so as to maintain its height while the proximal end thereof is fixed to the guide block and is engaged with the lead screw inserted through the bearing holes in the guide block 14 and is laid along one side of the housing of the apparatus, can have a deceased longitudinal length. Further, since the lower carriage arm is supported by the guide plate, the thickness of the apparatus is decreased. That is, the apparatus according to the present invention can offer remarkable technical effects and advantages.

Next, explanation will be hereinbelow made of a second embodiment of the present invention with reference to FIGS. 5 to 8.

Figure 5:
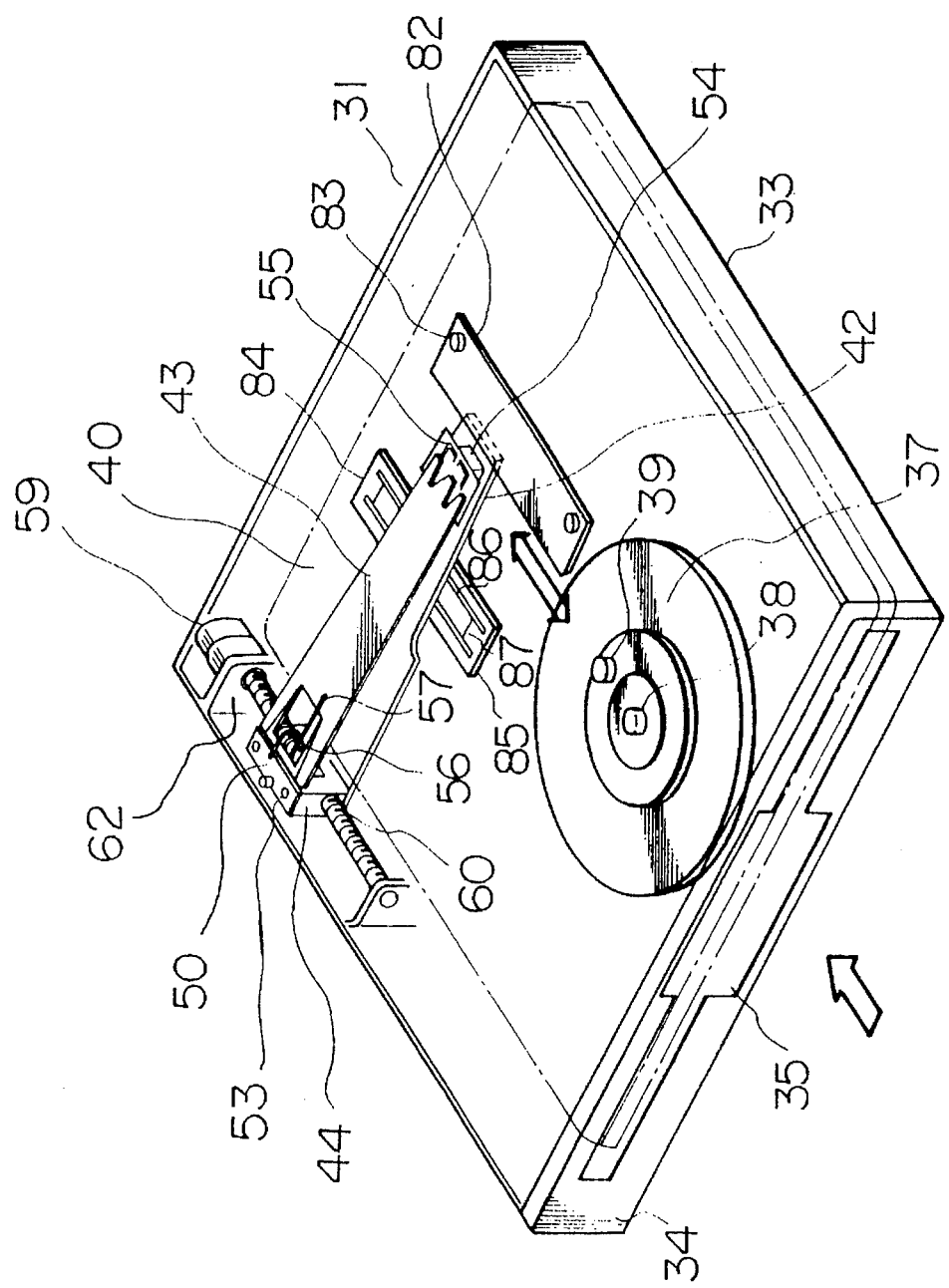
FIG. 5 is a perspective view illustrating a flexible disc apparatus in a second embodiment of the present invention.

Referring to FIG. 5 which shows a flexible disc apparatus, a flexible disc cartridge is inserted through an insertion slot and is loaded in the apparatus, being engaged with a rotary part associated with a shaft of a direct drive motor, through the intermediary of the hub part of the flexible disc cartridge. It is noted that a disc loading device including a cartridge holder, a drive unit therefor and the like are not shown in this figure.

As shown in FIG. 5, the flexible disc apparatus comprises a housing 31 having a front side wall 34 formed therein the insertion slot 35 for the flexible disc cartridge 32. The drive unit located in the housing 31 is urged toward the insertion slot 35 by a spring (which is not shown). The cartridge holder is inserted in the drive unit, and a guide pin (which is not shown) projected laterally therefrom and is engaged in guide grooves (which is also not shown) formed on side surfaces of the guide unit so that the holder is supported vertically movable. Further, when the flexible disc cartridge 32 is inserted into the cartridge holder through the insertion slot 35, a shutter on the flexible disc cartridge 32 is opened by a shutter lever (which is not shown) so that a flexible disc is exposed through an opening of the cartridge. Simultaneously, a drive unit is advanced toward the insertion slot 35, and the cartridge holder and the flexible disc cartridge 32 are lowered being guided by the guide pin engaged in the guide groove. On the contrary, when the drive unit is retracted, the cartridge holder and the flexible disc cartridge 32 are raised, and simultaneously, the shutter on the flexible disc cartridge 32 is released from the shutter lever so as to be closed. Then the cartridge 32 is retracted, and accordingly, a part of the cartridge 32 is projected from the insertion slot 35. The loaded flexible disc cartridge 32 and the like in the housing 31 are set aside toward one side of the housing 33, and a narrow space 36 is defined between the cartridge 32 and the other side wall of the housing 31 therewithin.

A direct drive motor 37 is supported at the center part of the bottom surface of the housing 31, having its output shaft carrying a coupling member 39 adapted to be engaged with the hub of the flexible disc.

A head support device 40 is provided in the inward rear part of the housing 31, having its distal end part located in the center part of the housing 31 and its proximal end part located in the narrow space 36 on one side of the housing 31, and a head positioning device 11 is located in the narrow space 36 along the longitudinal direction or the loading and unloading direction of the flexible cartridge 32.

The head support device 40 is composed of a lower carriage arm 42, an upper carriage arm 43 and the like. The lower carriage arm 42 is plate-like, and a guide block 44 is secured to the upper surface of the proximal end part (on the one side of the apparatus) of the lower carriage arm 42. The guide block 44 is provided thereon with rise parts 45, 45 at the opposite ends of the guide block 44, between which a space 46 is defined, as clearly shown in FIGS. 6 to 8. Further, a hole 47 is formed in each of the rise parts 45, at a position near to the bottom thereof. A metal bearing 48 is fitted in each of the holes 47. A leaf spring is integrally incorporated with the proximal end part of the upper carriage arm 43, and is attached to the guide block 44 by means of screws 53 together with a retaining plate 50 positioned by means of protrusions 51 and holes 5. Accordingly, the upper carriage arm 44 is vertically swingable, relative to the lower carriage arm 42 due to the flexibility of the leaf spring. A first magnetic head 54 for a side zero of a disc, and a second magnetic head for a side one of the disc are attached respectively to the upper and lower surfaces of the distal end parts (at the center side of the apparatus) of the lower and upper carriage arms 42, 43, being opposed to each other. A load spring 57 is inserted and supported on retaining plate 50, having one end which is hooked to a spring hook part 58 of the retaining plate 50, (refer to FIG. 6), and the other end which is hooked to the upper carriage arm 43, and accordingly, the upper carriage arm 43 and the second magnetic head 55 are urged toward the lower carriage arm 42 and the first magnetic head 54.

The head positioning device is composed of a stepping motor 59, a lead screw 60 and the like, and is longitudinally laid in the above-mentioned narrow space 36. The stepping motor 59 is supported on the bottom surface of the housing 31 at one inward rear corner of the latter, and the lead screw 60 is laid along the one side wall of the housing 31 in the loading and unloading direction of the flexible disc cartridge 32, and is integrally incorporated with the shaft of the stepping motor 59. The lead screw 60 is rotatably journalled at its opposite ends to support lugs 61, 62 which are projected inward from the one side wall of the housing 31, and are inserted, with its intermediate part, through the metal bearing parts 48 in the guide block 44.

Figure 6:
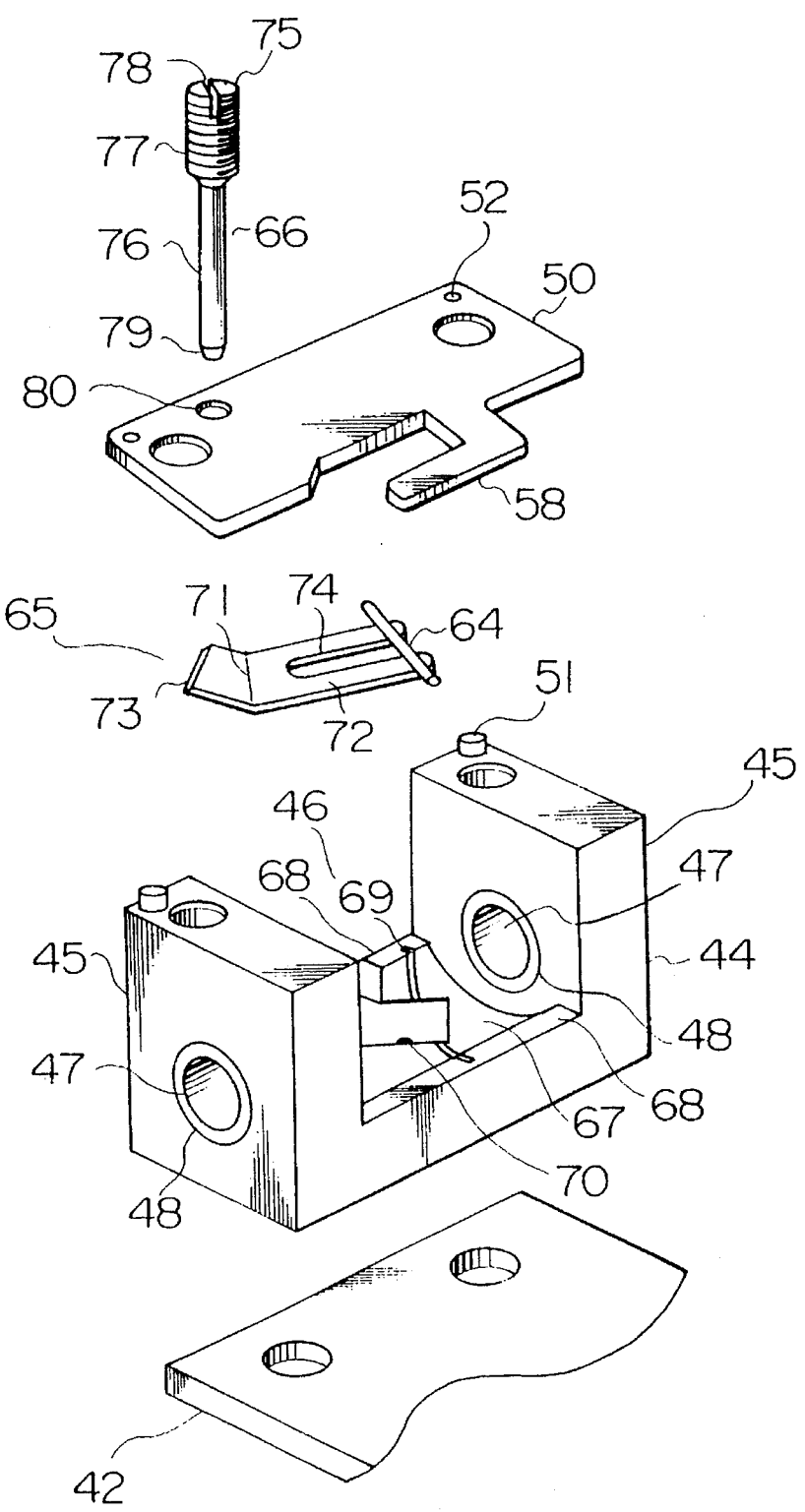
FIG. 6 is an exploded perspective view showing the relationship between a guide block and a lead pin shown in FIG. 5.
Figure 7:
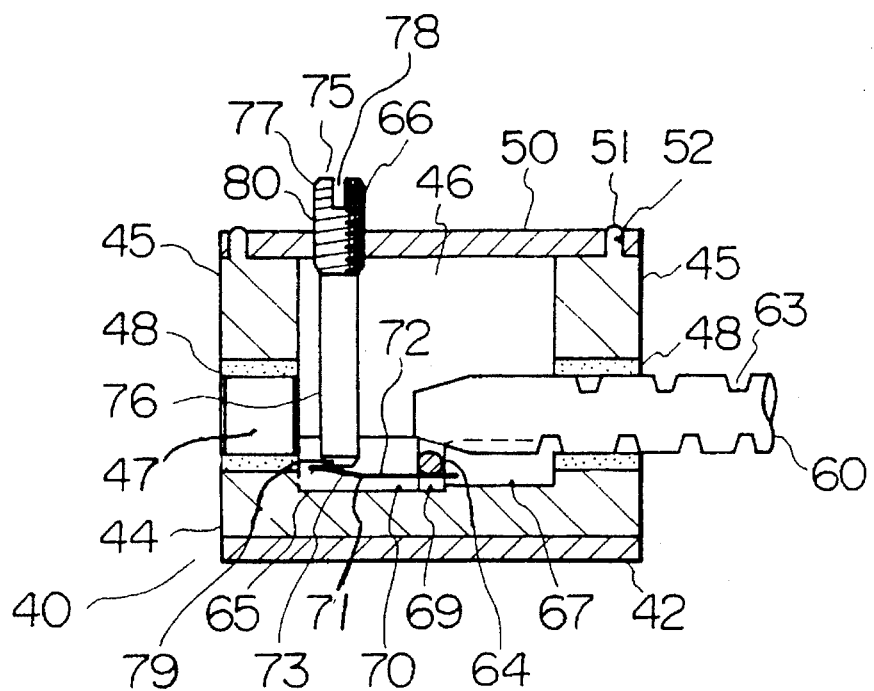
FIGS. 7 and 8 are sectional views showing relationship among the guide block, a lead pin and the lead screw shown in FIG. 5 during assembly.
Figure 8:
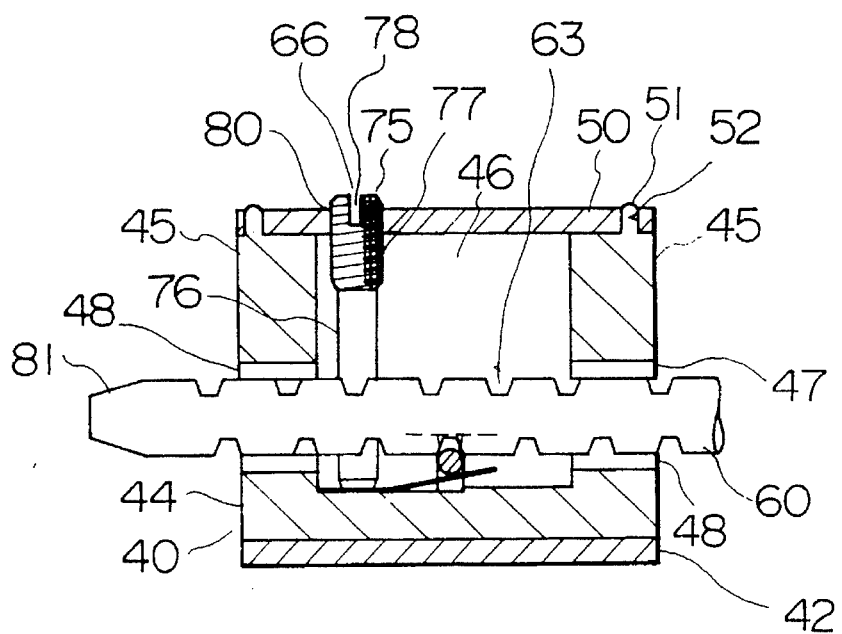

As clearly understood from FIGS. 6 to 8, in this embodiment, a lead pin 64 serves as a power transmission member engaged with a lead screw groove 63 on the lead screw 60, for transmitting a torque from the lead screw 60 to the head support device 40, and a pressing spring 65 and a pressing member 66 serves as an engagement holding means for holding the lead pin 64 in engagement with the lead screw groove 63.

An arcuate cross-sectional shape recess part 67 as a part of a cylinder having its axis aligned with the center axes of the metal bearings 48, 48 or the center axis of the lead screw 60 is formed on the bottom surface of the space 46 in the guide block 44 of the head support device 40. A groove 69 is formed in the inner peripheral surface of the recess part 67, extending from flange parts 68 on opposite sides of the recess part 67, in a plane crossing the lead screw 60. Further, a channel groove 70 is formed on the bottom part of the inner peripheral surface of the recess part 67, oblique to the groove 69, being cut through one of the flange parts 68, and having a flat bottom. This channel groove 70 crosses the groove 69 within the recess part 67.

The groove 69 receives therein the opposite end parts of the lead pin 64 which is supported in such a way that it can take a lower position where it is retracted from the lead screw groove 63 on the lead screw 60 and an upper position where it is engaged, in its intermediate part, with the lead screw groove 63 of the lead screw 60. The leaf spring 65 is inserted in the channel groove 70, having a width greater than the diameter of the lead screw 60, and being bent at its middle part so as to form a bent part 71, and a pressing part 72 and the a pressed part 73 on opposite sides of the bent part 71. The pressing part 72 is bifurcated by a slit 74 so as to give a stable resilient force. The pressing part 72 on one side of the bent part 71 is located just below the lead pin 64, within the channel groove 70, and the pressed part 73 on the other side of the bent part 71 is located on one side of the lead screw 60 journalled to the metal bearings 48, either the pressing part 72 or the pressed part 73 being inclined upward in the channel groove 70. Further, when the lead pin 64 is retracted downward, the pressing part 72 is lowered down while the pressed part 73 is inclined upward. On the contrary, when the pressed part 73 is pressed, the pressing part is inclined upward so as to raise the lead pin 64 which is therefore engaged with the lead screw groove 63.

The pressing member 66 has a proximal end part 75 and a shank part 76 having a diameter smaller than that of the proximal end part 75 and integrally incorporated therewith. A threaded part 77 is formed at the peripheral surface of the proximal end part 75 and a tool (a screw driver or the like) receiving groove 78 is formed on the top surface of the same. Further, the distal end part 79 of the shank part 76 is tapered, having a tip end face adapted to press the leaf spring 65. The pressing member 66 is inserted into a threaded hole 80 formed in the retaining plate 50 at a position on one side of the lead screw 60, so that the threaded part 77 of the proximal end part 75 is engaged with the threaded hole 80. Further, a tool is engaged in the groove 78 in order to turn the pressing member 66 which is therefore retracted (raised) as shown in FIG. 7 or extended (lowered) as shown in FIG. 8. When the pressing member 66 is retracted so as to release the pressed part 73 of the leaf spring 65, the lead pin 64 is allowed to descend while when the pressing member 66 is extended so as to press the pressed part 73 of the leaf spring 65, the pressing part 72 of the leaf spring 65 raises the lead pin 64 which is therefore engaged with the lead screw groove 63 on the lead screw 60.

During the assembly of the lead screw 60, the lead pin 64 and the like, at first, the leaf spring 65 is inserted in the channel groove 70 while the lead pin 64 is fitted in the groove 69, and then, the shank part 76 of the pressing member 66 is inserted into the threaded groove 80 in the retaining plate 50 so as to engage the threaded part 77 with the threaded hole 80. At this time, the pressing member is held at its upper position so as to release the pressed part 73 of the leaf spring 65, and accordingly, the pressing part 72 is set horizontally, below the lead pin 64 while the pressed part 73 is inclined upward. Then, the lead screw 60 is pushed into the bearing hole 48 on the side opposite to the pressing member 66 so that a tapered part 81 of the forward end part of the lead screw 60 forces the lead pin 64 to retract therefrom while it is advanced, and the lead screw 60 is finally introduced into the other metal bearing 48. After the completion of the assembly of the lead screw 60, the tool is inserted in the receiving groove 78 on the pressing member 66 which is therefore turned and advanced, and accordingly, the pressed part 73 of the leaf spring 65 is pressed against the flat bottom surface of the channel groove 70. Accordingly, the pressing part 72 of the leaf spring 65 is inclined upward so as to raise the lead pin 64 into the groove 69. Thus, the intermediate part of the lead pin 64 is engaged with the lead screw groove 63 on the lead screw 60, and therefore, the lead pin 64 is stably held in engagement with the lead screw groove 63 under the pressure of the leaf spring 65.

As shown in FIG. 5, a guide plate 82 is horizontally secured to projected parts on the bottom surface 33 of the housing 31 underneath the loaded flexible disc cartridge 32, and the distal end part of the lower carriage arm 42 is inserted below the guide plate 82 so as to be slidably engaged with the lower surface of the guide plate 82. Thus, the height of the lower carriage arm 42 is regulated.

An urging member 84 is attached on the bottom surface of the housing 31 underneath the lower carriage arm 42 at a position between the proximal and distal end parts of the lower carriage arm 42. The urging member 84 is made of plastic materials or the like, and is composed of a rectangular frame part 85 having opposite ends, a plate-like urging part 86 and connecting parts 87 connected to the opposite end parts of the rectangular frame part 85 on opposite side of the urging part 86. Each of the connecting parts 87 is gradually thinned toward the frame part 85 so as to be elastically deformable, and the urging part 86 is projected slightly above the frame part 85. Further, the urging part 86 is made into press-contact with the lower surface of the lower carriage arm 42 with the use of the elastic deformation of the connecting parts 87, and the upper surface of the distal end part of the lower carriage arm 42 is made to abut against the lower surface of the guide plate 82 due to the elastic restoration of the connecting parts 87; thereby it is possible to stably hold the height of the lower carriage arm 42.

Thus, since the lower and upper carriage arms 42, 43 and the like are prevented from being rotated, through the guide by the guide plate 82, they are moved along the lead screw 60 due to the engagement between the lead screw groove 63 and the lead pin 64 when the lead screw 66 is rotated by the driven stepping motor 59. That is, the first and second magnetic heads 54, 55 are moved radially of the flexible disc.

The clearance between the outer diameter of the lead screw 60 and the inner diameter of the metal bearings 48 is about several microns or several tenth of microns, and further, the depth of engagement between the lead screw groove 63 and the lead pin 64 is less than 1/10 of a value in a range of 0.15 to 0.4 mm. Thus, the lead pin 64 never come off from the lead screw groove 63. Further, recording and reproducing gaps on the magnetic heads 54, 55 are positioned at recording tracks on the flexible disc so that the interchangeability of flexible discs can be held.

When the cartridge holder is raised, the upper carriage arm 43 and the second magnetic head 55 are turned upward overcoming the resilient force of the load spring 57 so as to be prevented from making contact with the flexible disc, while when the cartridge holder is lowered, they are turned downward due to the elastic restoration of the load spring 57 so that the first and second magnetic 54, 55 hold the flexible disc therebetween.

Explanation will be hereinbelow made of the operation of the above-mentioned arrangement.

When a flexible disc cartridge 32 is inserted through the insertion slot 35, a shutter on the flexible disc cartridge 32 is opened by the shutter lever as mentioned above, and the cartridge holder and the flexible disc cartridge 32 are lowered in association with the advance of the drive unit so that the hub of the flexible disc is engaged with the output shaft 38 of the motor 37 through the coupling member 39, and an exposed part of the flexible disc through the opened shutter makes contact with the first magnetic head 54 on the lower carriage arm 42. Due to the descent of the cartridge holder, the upper carriage arm 43 and the second magnetic head 55 are turned downward so that an exposed part of the flexible disc makes contact with the second magnetic head 55 through the opened shutter.

The disc is rotated by driving the motor 37, and the lead screw 60 is rotated by driving the stepping motor 59. Accordingly, the first and second magnetic heads 54, 55 are moved radially of the flexible disc through the engagement between the lead screw groove 63 and the lead pin 64. Since the lead screw groove 63 is formed so as to have an angle which can be determined from the turn angle of the stepping motor 59 and the pitches of recording tracks on the flexible disc, the lead pin 64, the lower and upper carriage arms 42, 43, and the first and second magnetic heads 54, 55 are fed pitch by pitch of the recording tracks, each time when the stepping motor 59 is turned, and accordingly, the first and second magnetic heads 54, 55 are positioned at recording tracks on the flexible disc. Further, the lead screw 60 is set to have a length which is greater than the sum of the distance of the recording area of the flexible disc and the length of the guide block 44, and accordingly, the first and second magnetic heads 54, 55 can be positioned at every recording track on the flexible disc. Further, the relative height between the recording surfaces of the magnetic heads 54, 55 and the flexible disc can be held stably while the recording and reproducing are performed.

On the contrary, when the drive unit is retracted as mentioned above, the cartridge holder and the flexible disc cartridge 32 are lifted up so that the upper carriage arm 43 and the second magnetic head 55 are raised, and the flexible disc is pushed by the shutter lever so that one part of the flexible disc is projected from the cartridge holer while the shutter is closed. Thus, the flexible disc cartridge 32 can be removed from the insertion slot 35.

Thus, with the above-mentioned arrangement in which the lead pin 64, the leaf spring 65 and the pressing member 66 are beforehand set on the guide block 44 and the like of the head support device 40, when the pressing member 66 is turned and advanced by a tool engaged with the top thereof after the lead screw 60 is incorporated in the guide block 44 in the head support device 40, the lead pin 64 is held in engagement with the lead screw groove 63 on the lead screw 60 under pressure given by the leaf spring 65; thereby it is possible to facilitate and promote the assembly of the head support device 40.

In the above-mentioned arrangement, the lead pin 64 is guided vertically by the groove 69 toward the lead screw 60 so as to be engaged with the lead screw groove 63 by means of the pressing force of the leaf spring 65; thereby it is possible to stably set the lead pin 64 in egagement with the lead screw groove 63.

Further, since the lead screw 60 is inserted through the metal bearings 48 in the guide block 44, the lead screw can also serve as a guide rod.

Since the flexible disc cartridge 32 is set aside toward one side wall of the housing 31 so as to obtain a narrow space 36 between the one side wall of the housing 31 and the cartridge, the lead screw is laid in the narrow space and the lower carriage arm can be extended from the one side to the center of the apparatus. Further, the distal end of the lower carriage arm 13 is slidably supported by the guide plate 25 so that the height thereof is uniformly held. Further, since the lead screw 60 coupled with the stepping motor 59 is inserted in the metal bearing 48 in the guide block 44 at the proximal end of the lower carriage arm 42, and is engaged with the lead pin 64, the lead screw 60 can be laid along a one side wall of the apparatus; thereby it is possible to shorten the longitudinal length, that is, the inward depth of the apparatus. Further, the upper surface of the distal end part of the lower carriage arm 43 is made into contact with the lower surface of the guide plate 82 so as to regulate the height thereof, resulting in a less number of components located underneath the loaded flexible disc cartridge, and accordingly, it is possible to reduce the overall height H1 of the apparatus.

Further, the lower carriage arm 42 and the first magnetic head 54 are stably held at their heights by means of the urging member 84, that is, their height can be regulated; thereby it is possible to enhance the vibration resistance. Further, a sufficient clearance can be ensured for the flexible disc during loading and unloading thereof; thereby it is possible to eliminate the risk of breakage of the magnetic heads due to thinning of the apparatus.

Figure 9:
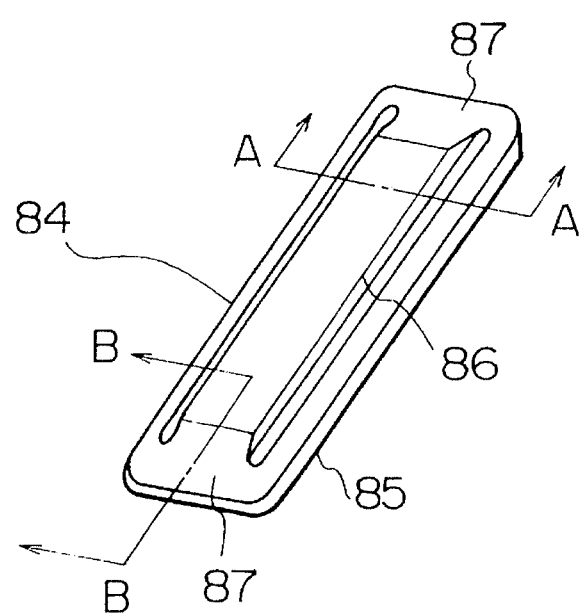
FIG. 9 is a perspective view illustrating a pressing member which is part of a flexible disc apparatus in a third embodiment of the present invention.
Figure 10:
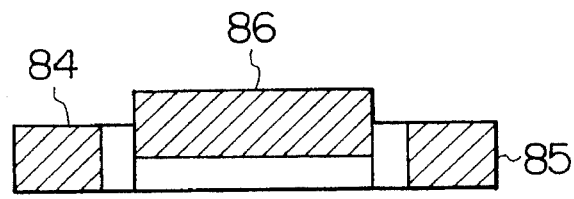
FIG. 10 is a sectional view along line A—A in FIG. 9.
Figure 11:
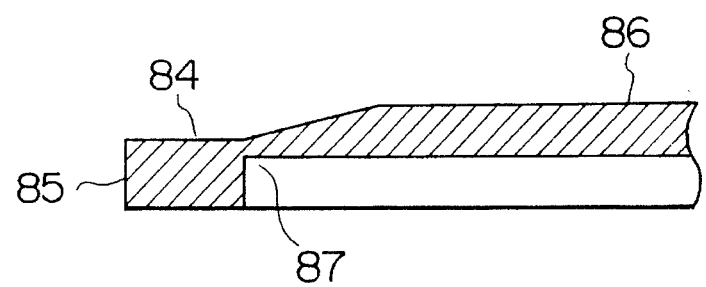
FIG. 11 is a sectional view along line B—B in FIG. 9.
Figure 12:
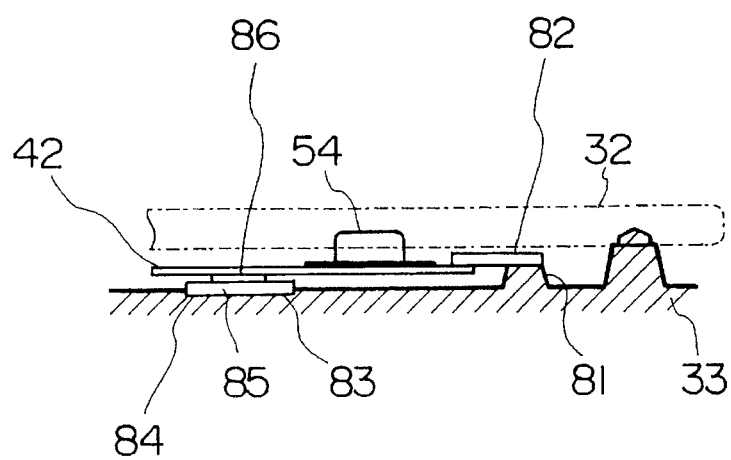
FIG. 12 is a side view showing the relationship among a lower carriage arm, a guide member and the pressing member in the flexible disc apparatus in the third embodiment of the present invention, in which a disc cartridge and the housing of the apparatus body are also shown in a sectional view.

Next, explanation will be made of a third embodiment of the present invention with reference to FIGS. 9 to 10.

The third embodiment of the present invention is essential in the urging member 84 which has been already explained in the second embodiment. That is, the arrangement of the flexible disc apparatus is similar to that explained in the second embodiment, and accordingly, the detail explanation thereof will be abbreviated with the sake of brevity.

The urging member 84 is made of plastic materials or the like, is composed of rectangular frame parts 85 having opposite ends, and a plate-like urging part 86, and connecting parts 87 connected to the opposite ends of the rectangular frame 85 on both sides of the urging part 86. Each of the connecting parts 87 is gradually thinned toward the frame part 85 so as to be elastically deformable, and the urging part 86 is slightly projected upward from the frame part 85. The minimum wall thickness of the connecting parts 87 on the frame part 85 side is set to be 0.2 to 0.3 mm so that the urging part 86 can be moved in substantially parallel with the frame part 85. The resilient force due to deformation is set to be about 5 to 30 gf. Further, the urging part 86 is made into press-contact with the lower surface of the lower carriage arm 42 through elastic deformation of the connecting parts 87, and the upper surface of the distal end of the lower carriage arm 42 is made into press-contact with the lower surface of the guide plate 82, thereby it is possible to aim at stably holding the height of the lower carriage arm 42. Thus, since the lower and upper carriage arms 42, 43 and the like are prevented from being rotated, through the guide by the guide plate 82, they are moved along the lead screw 60 due to the engagement between the lead screw groove 63 and the lead pin 64 when the lead screw 60 is rotated by the driven stepping motor 59. That is, the first and second magnetic heads 54, 55 are moved radially of the flexible disc.

Referring to FIG. 8, the clearance between the outer diameter of the lead screw 60 and the inner diameter of the metal bearings 48 is about several micron meters or several tenth microns, and further, the depth of engagement between the lead screw groove 63 and the lead pin 64 is less than 1/10 of a value in a rage of 0.15 to 0.4 mm. Thus, the lead pin 64 never come off from the lead screw groove 63. Further, recording and reproducing gaps on the magnetic heads 54, 55 are positioned at recording tracks on the flexible disc so that the interchangeability of flexible discs can be held.

Although the present invention has been detailed in the form of preferred embodiments, the technical concept of the present invention should not be limited to the above-mentioned embodiment alone, but it can be variously modified within the scope defined by the appended claims.

What is claimed is:

1. A flexible disc apparatus comprising:

a housing having an insertion slot through which a disc cartridge is inserted and an accommodation space wherein said thus inserted disc cartridge is loaded and a disc in said disc cartridge is rotated, said housing having a front side defining therein said insertion slot, a rear side opposing the front side, left and right sides on opposite sides of the front side and also having a chassis incorporated into said housing so as to define a bottom surface in said accommodation space;

a rotatable lead screw laid along and rotatably supported on one of said left and right sides, said lead screw extending in a cartridge loading and unloading direction in which said cartridge is loaded in and unloaded from said accommodation space through said insertion slot;

a guide block having bearing holes through which the lead screw pierces and adapted to be moved in said cartridge loading and unloading direction;

a pair of upper and lower carriage arms extending into said accommodation space from said guide block and adapted to interpose said loaded disc cartridge between said upper and lower carriage arms;

upper and lower reading heads mounted respectively on said upper and lower carriage arms, for picking up signals from upper and lower surfaces of said disc, respectively;

a guide plate extending in said cartridge loading and unloading direction and fixed to protrusions formed on said chassis so as to define a gap between said guide plate and the chassis, said guide plate being slidably engaged with a distal end of said lower carriage arm;

a means for resiliently holding said distal end of said lower carriage arm against said guide plate so that said distal end of said lower carriage arm slides along said guide plate at a substantially uniform height from the chassis;

a lead pin fixed to said guide block and engaged with said lead screw; and a stepping motor located adjacent to said one of said left and right sides, and adjacent to said rear side of said housing, having a drive shaft integrally incorporated with one end of said lead screw for rotating said lead screw so as to feed said guide block through said lead pin, whereby said reading heads are fed radially with respect to said disc in said cartridge loading and unloading direction.

2. A flexible disc apparatus as set forth in claim 1, wherein said guide block is formed therein with a cut-out, leaving opposite end parts thereof as rise parts, said bearing holes through which said lead screw pierces, are formed respectively in said rise parts, and the cut-out has a bottom surface which has formed therein a recess part having an inner peripheral surface formed with grooves in which said lead pin is received.

3. A flexible disc apparatus as set forth in claim 1, wherein an sintered oleo-metal is press-fitted in each of said bearing holes.

4. A flexible disc as set forth in claim 1, wherein a slide member adapted to cooperate with the distal end of said lower carriage arm so as to hold said guide plate therebetween is provided to the distal end of said lower carriage arm.

5. A flexible disc apparatus as set forth in claim 4, wherein said slide member is coated thereover with a friction reducing material.

6. A flexible disc apparatus as set forth in claim 4, wherein said slide member comprises a spring member and a load spring made of plastic material and disposed on said spring member.

7. A flexible disc apparatus comprising:

a housing having an insertion slot through which a disc cartridge is inserted and an accommodation space wherein said thus inserted disc cartridge is loaded and a disc in said disc cartridge is rotated, said housing having a front side defining therein said insertion slot, a rear side opposing the front side, left and right sides on opposite sides of the front side and also having a chassis incorporated into said housing so as to define a bottom surface in said accommodation space;

a rotatable lead screw laid along and rotatably supported on one of said left and right sides, said lead screw extending in a cartridge loading and unloading direction in which said cartridge is loaded in and unloaded from said accommodation space through said insertion slot;

a guide block having bearing holes through which the lead screw pierces and adapted to be moved in said cartridge loading and unloading direction.

a pair of upper and lower carriage arms extending into said accommodation space from said guide block and adapted to interpose said loaded disc cartridge between said upper and lower carriage arms;

upper and lower reading heads mounted respectively on the upper and lower carriage arms, for picking up signals from upper and lower surfaces of said disc, respectively;

a guide member slidably engaged with a distal end of said lower carriage arm;

a lead pin fixed to said guide block and engaged with said lead screw; and a stepping motor located adjacent to said one of said left and right sides, and adjacent to said rear side of said housing, having a drive shaft integrally incorporated with one end of said lead screw for rotating said lead screw so as to feed said guide block through said lead pin, whereby said reading heads are fed radially with respect to said disc in said cartridge loading and unloading direction, said guide block being formed with a cut-out leaving opposite end rise parts in which said bearing holes are formed, respectively, said cut-out having a bottom surface in which a recess part having an inner peripheral surface is formed, and said lead screw piercing through said bearing holes formed in said rise parts, and said lead pin having opposite ends which are held in a groove formed in said inner peripheral surface of said recess part and being resiliently urged toward said lead screw.

8. A flexible disc apparatus as set forth in claim 7, wherein said resilient means is composed of a leaf spring having one and the other end parts and provided so as to perform a see-saw motion, and a pressing member screwed into a threaded hole formed in a member bridging between said rise parts, and the other end part of said leaf spring presses said lead pin against said lead screw by pressing said one end part of said leaf spring by means of said pressing member.

9. A flexible disc apparatus as set forth in claim 8, wherein said leaf spring is bent at a predetermined angle so as to form an apex serving as a fulcrum point for the see-saw motion on the bottom surface of said recess part.

10. A flexible disc apparatus comprising:

a housing having an insertion slot through which a disc cartridge is inserted and an accommodation space wherein said thus inserted disc cartridge is loaded and a disc in said disc cartridge is rotated, said housing having a front side defining therein said insertion slot, a rear side opposing the front side, left and right sides on opposite sides of the front side and also having a chassis incorporated into said housing so as to define a bottom surface in said accommodation space;

a rotatable lead screw laid along and rotatably supported on one of said left and right sides, said lead screw extending in a cartridge loading and unloading direction in which said cartridge is loaded and unloaded from said accommodation space through said insertion slot;

a guide block having bearing holes through which the lead screw pierces and adapted to be moved in said cartridge loading and unloading direction;

a pair of upper and lower carriage arms extending into said accommodation space from said guide block and adapted to interpose said loaded disc cartridge between said upper and lower carriage arms;

upper and lower reading heads mounted respectively on the upper and lower carriage arms, for picking up signals from upper and lower surfaces of said disc, respectively;

a guide member slidably engaged with a distal end of said lower carriage arm;

a pressing means for normally pressing said distal end of said lower carriage arm against said guide member;

a lead pin fixed to said guide block and engaged with said lead screw; and a stepping motor located adjacent to said one of said left and right sides, and adjacent to said rear side of said housing, having a drive shaft integrally incorporated with one end of said lead screw for rotating said lead screw so as to feed said guide block through said lead pin, whereby said reading heads are fed radially with respect to said disc in said cartridge loading and unloading direction.

11. A flexible disc apparatus as set forth in claim 10, wherein said pressing means includes an urging member secured to a bottom surface of said housing in said disc cartridge accommodation space, an intermediate part of said lower carriage arm is urged upward by said urging member while it is slid on the urging member, and as a result, the distal end of said lower carriage arm is positively pressed against said guide member.

12. A flexible disc apparatus as set forth in claim 11, wherein said urging member is composed of a frame part, an urging part for urging said lower carriage arm, thin wall connecting parts connecting opposite sides of said urging part with said frame part, said connecting parts being elastically deformable.

* * * * *